US008903975B2

(12) United States Patent
You et al.

(10) Patent No.: US 8,903,975 B2
(45) Date of Patent: Dec. 2, 2014

(54) METHOD FOR INTERACTION BETWEEN RESOURCE AND ADMISSION CONTROL SYSTEMS AND RESOURCE AND ADMISSION CONTROL SYSTEM

(75) Inventors: Jianjie You, Guangdong Province (CN); Jun Song, Guangdong Province (CN); Mo Sun, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,045

(22) PCT Filed: Mar. 23, 2010

(86) PCT No.: PCT/CN2010/071196
§ 371 (c)(1),
(2), (4) Date: Sep. 21, 2011

(87) PCT Pub. No.: WO2011/022961
PCT Pub. Date: Mar. 3, 2011

(65) Prior Publication Data
US 2012/0151029 A1     Jun. 14, 2012

(30) Foreign Application Priority Data

Aug. 25, 2009 (CN) .......................... 2009 1 0169337

(51) Int. Cl.
*G06F 15/173* (2006.01)
*H04L 12/911* (2013.01)
*H04L 12/14* (2006.01)
*H04L 12/801* (2013.01)
*H04L 12/857* (2013.01)
*H04L 12/915* (2013.01)
*H04M 15/00* (2006.01)

(52) U.S. Cl.
CPC .............. *H04L 47/824* (2013.01); *H04L 12/14* (2013.01); *H04L 12/1403* (2013.01); *H04L 47/10* (2013.01); *H04L 47/2491* (2013.01); *H04L 47/781* (2013.01); *H04L 47/785* (2013.01); *H04M 15/43* (2013.01); *H04M 15/55* (2013.01); *H04M 15/66* (2013.01)
USPC ......................................................... 709/223

(58) Field of Classification Search
CPC ..................................................... G06F 15/173
USPC .................................... 709/223–226; 370/437
See application file for complete search history.

(56) References Cited

U.S. PATENT DOCUMENTS

2009/0219946 A1* 9/2009 Liu et al. ........................ 370/437
2010/0034195 A1* 2/2010 Das et al. ....................... 370/352
2010/0287599 A1 11/2010 He et al.

FOREIGN PATENT DOCUMENTS

CN         1889499 A     1/2007
(Continued)

OTHER PUBLICATIONS

International Search Report for PCT/CN2010/071196 dated Jun. 23, 2010.
(Continued)

*Primary Examiner* — Vivek Srivastava
*Assistant Examiner* — Sibte Bukhari
(74) *Attorney, Agent, or Firm* — Ling Wu; Stephen Yang; Ling and Yang Intellectual Property

(57) ABSTRACT

The present invention discloses a method for an interaction between resource and admission control systems and a resource and admission control system, the method includes: a resource and admission control function in a fixed network receiving a request message transmitted by a Policy and Charging Rule Function (PCRF) in a mobile network, and converting the request message or parameters carried in the request message into a form that can be processed or identified by a transport functional entity in the fixed network. The technical scheme of the present invention complies with the development trend of the future network, and is simple and practical.

16 Claims, 5 Drawing Sheets

(56) References Cited

FOREIGN PATENT DOCUMENTS

| CN | 101188504 A | 5/2008 |
|---|---|---|
| CN | 101262440 A | 9/2008 |
| CN | 101262441 A | 9/2008 |
| WO | 2007079773 A1 | 7/2007 |
| WO | 2009092299 A1 | 7/2009 |

OTHER PUBLICATIONS

"Proposal for the interaction between RACF and PCC in Y.2111"; Study Group 13-Contribution 331; ZTE Corporation, China Telecom; International Telecommunication Union, COM 13-C 331-E, Aug. 2009; XP17443764A; See pp. 1-9.

"Proposal for RACF and non-RACF cooperation"; Study Group 13-Contribution 275; China Telecom; International Telecommunication Union, COM 13-C 275-E, Aug. 2009; XP17443707A; See pp. 1-2.

"Resource and Admission Control Sub-System (RACS)"; Telecommunications and Internet converged Services and Protocols for Advanced Networking (TISPAN); Functional Architecture; Final draft ETSI ES 282 003 V3.4.0 (Jul. 2009), XP14044413A; See the whole document.

"Technical Specification Group Services and System Aspects"; 3rd Generation Partnership Project; Policy and charging control architecture (Release 9); 3GPP TS 23.203 V9.1.0 (Jun. 2009), XP50363031A; See the whole docement.

"Output-Draft Recommendation Y.RACF (Y.2111) Revision 2 (Version 0.1.0)"; Temporary Document; Editors; International Telecommunication Union, NGN-GSI, TD 120 (NGN-GSI), Geneva, May 11-22, 2009; XP17565297A, See pp. 1-161.

* cited by examiner

METHOD FOR INTERACTION BETWEEN RESOURCE AND ADMISSION CONTROL SYSTEMS AND RESOURCE AND ADMISSION CONTROL SYSTEM

TECHNICAL FIELD

The present invention relates to the field of communications, and in particular, to a method for interaction between resource and admission control systems and a resource and admission control system.

BACKGROUND OF THE RELATED ART

The Next Generation Network (NGN) is a hot research subject of the current communication standard field, which uses packet technologies such as IP as bearer network technologies to incorporate fixed and mobile communications. The NGN can provide richer multimedia services, such as emerging services with real-time requirements (such as VoIP, video conference, multimedia tele-learning, video on demand, etc.), which require the communication networks to provide efficient end-to-end Quality of Service (QoS) support; while the requirements of users on the network QoS are also increasing. Therefore, how to provide the end-to-end QoS will be one of the core issues of the NGN.

The International Telecommunication Union-Telecommunications standardization sector (ITU-T for short) is a telecommunication sector of the International Telecommunication Union (ITU for short), which establishes a standard for resource and admission control. In the latest Resource and Admission Control Functions (RACF for short) draft promulgated by the ITU-T, a functional frame of the RACF is provided. As shown in FIG. 1, the RACF is comprised of two parts, which respectively are a Policy Decision Functional Entity (PD-FE for short) and a Transport Resource Control Functional Entity (TRC-FE), wherein, the TRC-FE interacts with the transport functions through a Rc, and interacts with the Transport Resource Enforcement Functional Entity (TRE-FE for short) through a Rn, and the PD-FE interacts with the TRC-FE through a Rt, interacts with a Customer Premises Network (CPN for short) through a Rh, interacts with a Policy Enforcement Functional Entity (PE-FE for short) through a Rw, interacts with Service Control Functions (SCF for short) of a service layer through a Rs, and interacts with Network Attachment Control Functions (NACF for short) through a Ru, and the PD-FE interacts with other NGNs through a Ri interface.

In addition, the PD-FE has nothing to do with the transport technologies, and also has nothing to do with the SCF, and the PD-FE makes the final decision on the resource and admission control based on network policy rules, service information provided by the SCF, transport-layer subscription information provided by the NACF, and results of resource availability decisions provided by the TRC-FE.

The TRC-FE has nothing to do with services, but is related to the transport technologies. The TRC-FE is responsible for collecting and maintaining transport network information and resource state information. After receiving a resource request from the PD-FE, the TRC-FE makes a resource based admission control based on the QoS, priority requirements, resource availability information, and transport related policy rules.

The transport layer is comprised of the PE-FE and the TRE-FE. The PE-FE implements policy rules issued by the PD-FE, and the PE-FE is a packet-to-packet gateway, which can be located between a Customer Premises Equipment (CPN) and an access network, between the access network and a core network or between networks of different operators, and is a key node for supporting dynamic QoS control, port address translation control, and Network Address Translator (NAT for short) traversal. The TRE-FE performs transport resource policy rules issued by the TRC-FE, and its scope and function as well as the Rn interface are to be studied further, and are not in the range of study of R2 phase.

Telecommunication and Internet converged Services and Protocols for Advanced Networking (TISRAN) presents a Resource and Admission Control Subsystem (RACS) to solve the QoS problem of a NGN bearer network from the prospective of a fixed access. The TISPAN divides the NGN architecture into a service layer and a transport layer, and introduces the RACS and the Network Attachment SubSystem (NASS) into the transport control layer. The RACS solves the QoS problem of the NGN bearer network, and the NASS is responsible for providing an upper service layer with an independent user access management. The main functions of the TISPAN RACS are similar to those of the ITU-T RACF.

The functional architecture of the TISPAN RACS is shown in FIG. 2. The RACS associates service requirements of the service layer with resource allocation of the transport layer, and mainly implements functions such as policy control, resource reservation, admission control, NAT traversal etc. The RACS provides control services of the transport layer to the service layer through a series of QoS policies, enabling the User Equipment (UE) to obtain the required QoS guarantee.

The RACS is comprised of two entities, i.e., a Service-based Policy Decision Function (SPDF) and an Access-Resource and Admission Control Function (A-RACF).

SPDF:

The SPDF provides a uniform interface to the service layer, shields the underlying network topology and the specific access type, and provides service-based policy control. The SPDF selects local policies based on a request of a Application Function (AF), and maps the request into IP QoS parameters to transmit to the A-RACF and a Border Gateway Function (BGF), to control corresponding resources.

A-RACF:

The A-RACF controls the access network, and includes admission control and network policy convergence functions, receives a request from the SPDF, then implements the admission control based on the stored policies, and accepts or rejects the request for transport resources. The A-RACF obtains network attachment information and user QoS profile information from a NASS through an e4 interface, and thus determines available network resources based on network location information (such as an address of a physical node of a access user), while refers to the user QoS profile information when processing a resource allocation request.

The transport layer includes two functional entities, i.e., a Border Gateway Function (BGF) and a Resource Control Enforcement Function (RCEF).

BGF:

The BGF is a packet-to-packet gateway, and can be located between the access network and the core network (to implement a core boarder gateway function), or can be located between two core networks (to implement an internet boarder gateway function). The BGF implements the NAT transversal, gate control, QoS tags, bandwidth limitations, usage measurement and resource synchronization functions under the control of the SPDF.

RCEF:

The RCEF performs media stream policies of layer 2/layer 3 (L2/L3) transmitted through a Re interface, and implements functions such as gate control, QoS tags, bandwidth limitations etc.

The 3rd Generation Partnership Project (3GPP) presents the Policy Control and Charging (PCC) from the prospective of a mobile access, to implement the resource and admission control function. The PCC is located between the service control layer and the access/bearer layer, and implements a certain QoS control mechanism for characteristics of the mobile access network, and functions mainly provided by the PCC are: implementing policy control based on customize information of the user and service data stream based charging control.

The functional architecture of the 3GPP PCC is shown in FIG. 3. The Policy and Charging Rule Function (PCRF) includes policy control decision and charging by flow control functions. The PCRF provides network control functions such as detection on service data stream, gate control, QoS, and charging by flow (except for credit management) which are oriented to the Policy and Charging Enforcement Function (PCEF).

The PCEF includes service data flow detection, policy implementation, and charging by flow functions. The functional entity is located at the Gateway (GW). The PCEF provides service data flow detection, user plane traffic processing, trigger control plane session management, QoS implementation, service data flow measurement and interaction with a charging system. The Subscription Profile Repository (SPR) stores user subscription data. The OCS and the OFCS are online and offline charging systems respectively, wherein, the OCS includes a Customized Application Mobile network Enhanced Logic Service Control Point (CAMEL SCP) and a service data flow based credit control.

Both the fixed and mobile networks are deployed to implement respective resource control systems and service functions. Mobile users (dual-mode mobile terminal) access and visit services such as mobile securities transactions in the mobile network through the fixed network, and its networking scheme is shown in FIG. 4. The resource and admission control function entities (RACF/RACS) in the fixed network are connected to the Policy and Charging Rule Function (PCRF) in the mobile network, and the PCRF is connected to the mobile user information repository. FIG. 5 further illustrates a diagram of an interaction between RACF/RACS and a PCC, wherein, the RACF/RACS is connected to the PCC through an interface S9', and the interface is mainly used for the information interaction between the RACF/RACS and the PCC.

As the RACF, the RACS and the PCC are largely different in terms of architecture, range of network, and involved types of nodes, the functions supported by the RACF, the RACS and the PCC under the existing technologies cannot implement the resource and admission control in the scene shown in FIG. 3. With the integration and open of different networks, there is an urgent need for harmonious resource control architecture to meet a service quality experience of the user.

SUMMARY OF THE INVENTION

The technical problem to be solved by the present invention is to provide a method for interaction between resource and admission control systems and a resource and admission control system, to implement the resource and admission control of a mobile user at a fixed network side.

In order to solve the above technical problem, the present invention provides a method for interaction between resource and admission control systems, comprising:

a resource and admission control function entity in a fixed network receiving request message transmitted by a Policy and Charging Rule Function (PCRF) entity in a mobile network, and converting the request message or parameters carried in the request message into the form that can be processed or identified by a transport functional entity in the fixed network.

The above method may further comprise the following features:

after the step of converting into the form that can be processed or identified by a transport functional entity in the fixed network, the method further comprises: the resource and admission control function entity further returning response message to the PCRF entity, and before returning the response message, converting parameters in the response message into the form that can be processed or identified by the PCRF entity or converting the response message into the form that can be processed or identified by the PCRF entity.

The above method may further comprise the following features:

before the step of the resource and admission control function entity receiving request message transmitted by the PCRF entity, the method further comprises: the PCRF entity further performing an authorization check on services, when the check passes, making a policy decision and establishing policy rules according to user subscription information, policy rules of local operators and/or service information, carrying the policy rules into the request message, and transmitting the request message to the resource and admission control function entity.

The above method may further comprise the following features:

in the step of receiving the request message and converting into the form that can be processed or identified by a transport functional entity in the fixed network, the resource and admission control function entity performs the authorization check to the services; and when the check passes, converts the policy rules in the request message into policy rules suitable for an installation of the transport functional entity in the fixed network.

The above method may further comprise the following features:

the request message is resource request message, or resource modification request message, or resource release request message.

The above method may further comprise the following features:

the resource and admission control function entity in the fixed network is a Resource and Admission Control Function (RACF) entity or a Resource and Admission Control Subsystem (RACS) entity.

The above method may further comprise:

the resource and admission control function entity further actively transmitting notification message to the PCRF entity, or transmitting the notification message to the PCRF entity according to the subscription of the PCRF entity, to notify the PCRF entity of current resource information and/or bearer information.

In order to solve the above technical problem, the present invention provides a resource and admission control function entity, comprising a receiving module and a conversion module, wherein, the receiving module is configured to receive request message transmitted by a Policy and Charging Rule Function (PCRF) entity in a mobile network; and the conversion module is configured to convert the received request message or parameters carried in the request message into the form that can be processed or identified by a transport functional entity in a fixed network.

The above resource and admission control function entity may further comprise the following features:

the conversion module is further configured to perform an authorization check on services; and when the check passes, convert policy rules carried in the request message into policy rules suitable for an installation of the transport functional entity in the fixed network.

In order to solve the above technical problem, the present invention provides a processor which comprises a resource and admission control system, comprising a resource and admission control function entity in a fixed network and a Policy and Charging Rule Function (PCRF) entity in a mobile network, wherein, the PCRF entity is configured to transmit request message to the resource and admission control function entity; and the resource and admission control function entity is configured to receive the request message transmitted by the PCRF entity, and convert the request message or parameters carried in the request message into the form that can be processed or identified by a transport functional entity in the fixed network.

The above system may further comprise the following features:

the resource and admission control function entity is further configured to return response message to the PCRF entity, and before returning the response message, convert the parameters in the response message into the form that can be processed or identified by the PCRF entity or convert the response message into the form that can be processed or identified by the PCRF entity.

The above system may further comprise the following features:

the PCRF entity is further configured to perform an authorization check on services, when the check passes, make a policy decision and establish policy rules according to user subscription information, policy rules of local operators and service information, and carry the policy rules into the request message.

The resource and admission control function entity is further configured to perform the authorization check on the services after receiving the request message; and when the check passes, convert the policy rules into policy rules suitable for an installation of the transport functional entity in the fixed network.

The above system may further comprise the following features:

the request message transmitted by the PCRF entity is resource request message, or resource modification request message, or resource release request message.

The above system may further comprise the following features:

the resource and admission control function entity in the fixed network is a Resource and Admission Control Function (RACF) entity or a Resource and Admission Control Subsystem (RACS) entity.

The above system may further comprise the following features:

the resource and admission control function entity is further configured to actively transmit a notification message to the PCRF entity, or transmit the notification message to the PCRF entity according to the subscription of the PCRF entity, to notify the PCRF entity of current resource information and/or bearer information.

The technical scheme of the present invention complies with the development trend of the future network, and is simple and practical.

PREFERRED EMBODIMENTS OF THE PRESENT INVENTION

Figure 1:
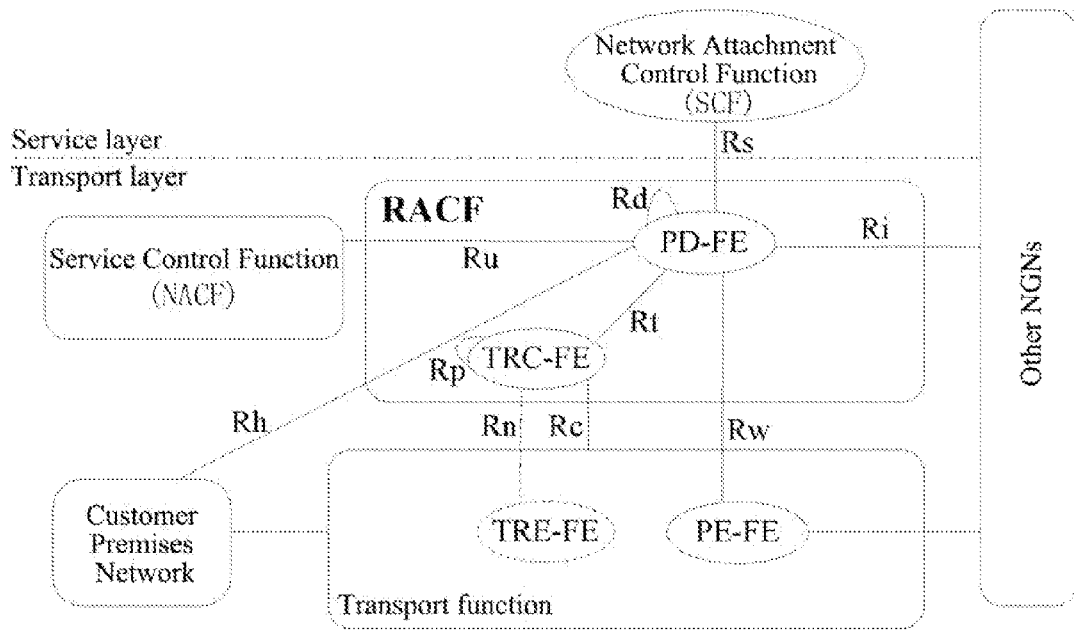
FIG. 1 is a diagram of functional architecture of an ITU-T RACF in the related art.
Figure 2:
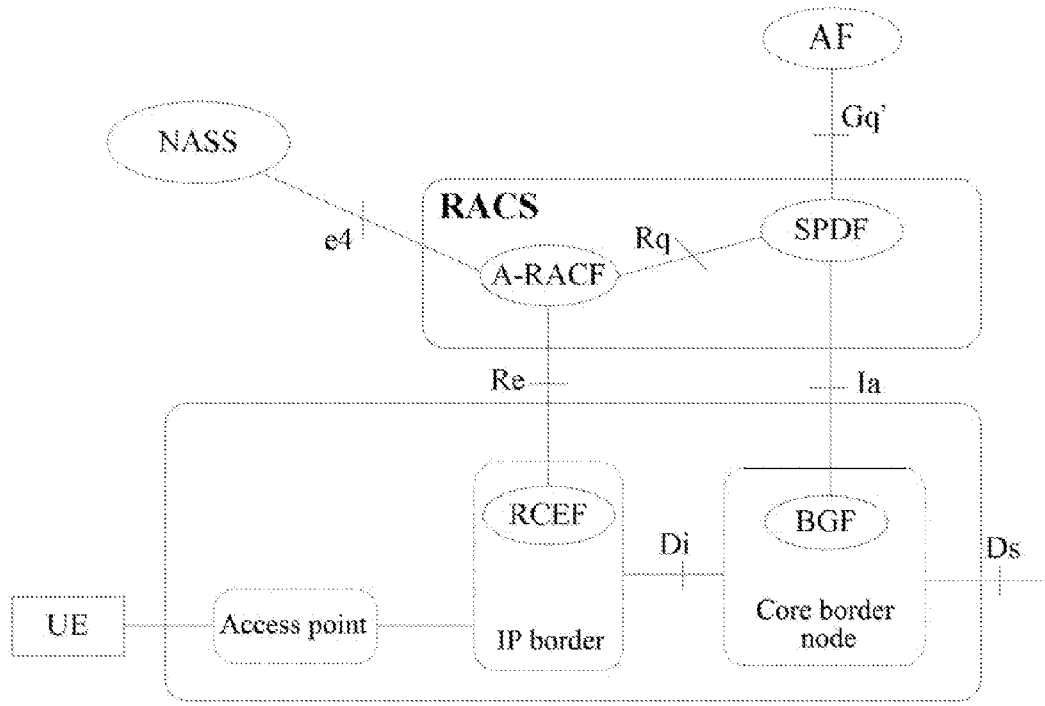
FIG. 2 is a diagram of functional architecture of a TISPAN RACS in the related art.
Figure 3:
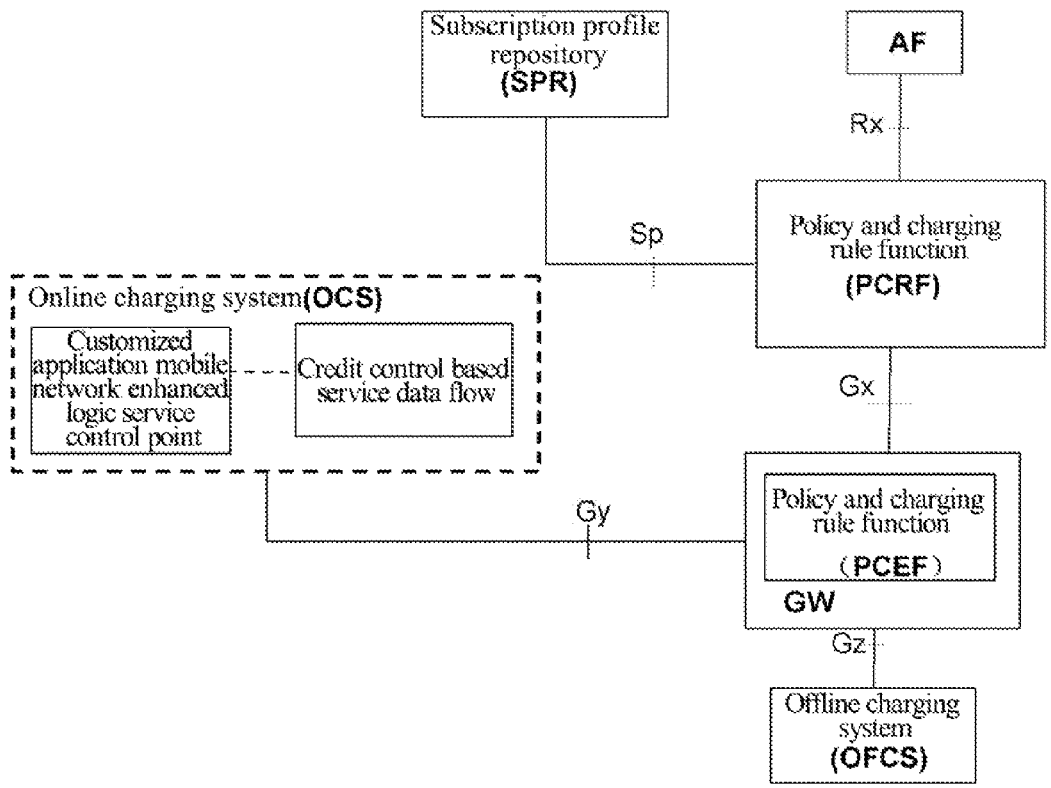
FIG. 3 is a diagram of functional architecture of a 3GPP PCC in the related art.
Figure 4:
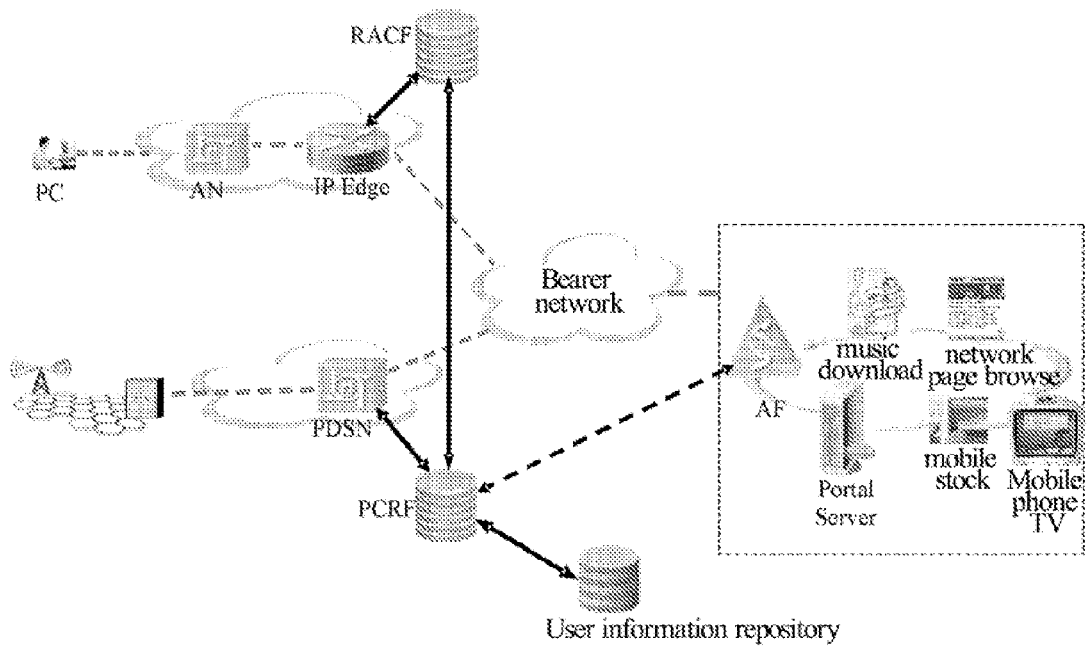
FIG. 4 is a diagram of networking involving an interaction between resource and admission control systems in the related art.
Figure 5:
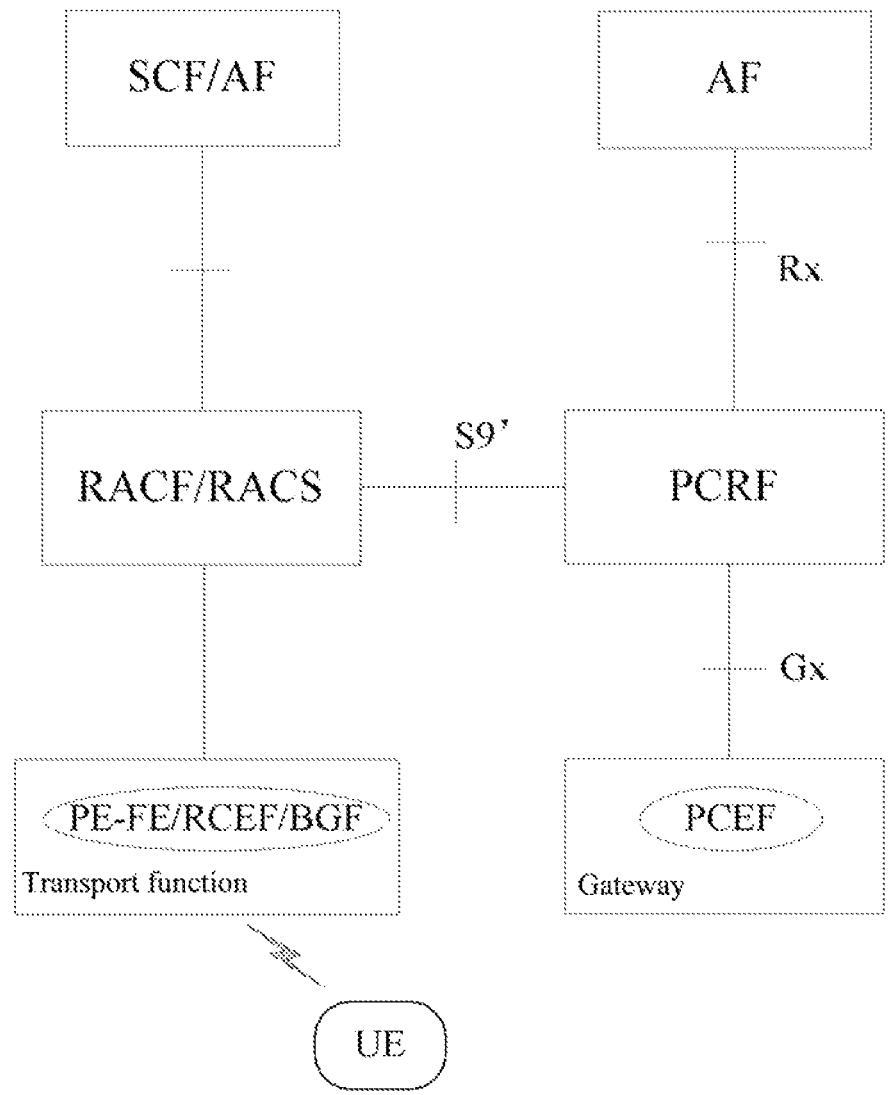
FIG. 5 is a diagram of an interaction between RACF/RACS and a PCC according to the present invention.

In order to make the purpose, technical schemes and advantages of the present invention more clear and apparent, the present invention will be further illustrated in detail hereinafter by way of example and with respect to accompanying drawings.

The basic idea of the present invention is that a mobile UE accesses a network at a fixed network side and invokes services in the mobile network, and performs policy control on the services through the interaction between s resource and admission control function (RACF/RACS) entity in the fixed network and a Policy and Charging Rule Function (PCRF) entity in a mobile network, and the RACF/RACS entity in the fixed network converts a format of message during the interaction.

The method for an interaction between resource and admission control systems provided by the present invention comprises:

a resource and admission control function (such as RACF/RACS) entity in the fixed network receiving request message from a Policy and Charging Rule Function (PCRF) entity in the mobile network, and converting or translating parameters carried in the request message into the form or format that can be processed or identified by a transport functional entity in the fixed network, or converting or translating the request message into the form or format that can be processed or identified by a transport functional entity in the fixed network to issue to the transport functional entity;

the resource and admission control function entity further returning response message to the PCRF entity, and before returning the response message to the PCRF entity, further converting or translating parameters in the response message into the form or format that can be processed or identified by the PCRF entity, or converting or translating the response message into the form of format that can be processed or identified by the PCRF entity;

wherein, the request message is resource request message, or resource modification request message, or resource release request message;

wherein, the PCRF entity further performs an authorization check on services according to user subscription information, policy rules of local operators etc.; when the check passes, the PCRF entity makes a policy decision and establishes policy rules according to user subscription information, policy rules of local operators and service information, and transmits the policy rules to the resource and admission control function entity through the request message; the resource and admission control function entity performs an authorization check on services according to policy rules of local operators, resource availability etc.; when the check passes, converts policy rules in the request message into policy rules suitable for an installation of the transport functional entity in the fixed network;

wherein, the resource and admission control function entity actively transmits notification message to the PCRF entity or transmits the notification message to the PCRF entity according to the subscription of the PCRF entity, to notify the PCRF entity of current resource information or bearer state information.

wherein, the interface S9' for an interaction between the RACF/RACS entity and the PCRF entity can be an inter-domain interface between the PCRF entities in the related art.

The method for an interaction between resource and admission control systems provided by the present invention comprises:

Step 101: a mobile UE accessing a network at a fixed network side, visiting a service function AF in a mobile network, and implementing a service negotiation of an application layer.

Step 102: the AF providing service information to the PCRF entity;

Step 103: the PCRF entity replying response message to the AF after storing the service information; and the PCRF entity also replying the response message to the AF after receiving the response message from the RACF/RACS entity;

Step 103: the PCRF entity performing an authorization check on services according to user subscription information, policy rules of local operators etc.; and if the check passes, the PCRF entity making a policy decision and establishing policy rules according to the user subscription information, the policy rules of local operators and the service information;

wherein, if the PCRF entity locally does not have the subscription information of the user, the PCRF entity interacts with the user information repository to acquire the subscription information of the user;

Step 104: the PCRF entity issuing the policy rules to the RACF/RACS entity;

wherein, the PCRF entity can issue the policy rules through resource request message or resource modification request message.

Step 105: the RACF/RACS entity firstly performing an authorization check according to policy rules of local operators, resource availability etc. after receiving the policy rules, and if the check passes, the RACF/RACS entity converting or translating the policy rules from the PCRF entity into policy rules suitable for the implementation of the transport functional entity at the fixed network side;

Step 106: the RACF/RACS entity transmitting the resource request or resource modification request message to the transport functional entity, which carries the final policy rules;

Step 107: the transport functional entity installing the policy rules, and transmitting response message to the RACF/RACS entity;

Step 108: the RACF/RACS entity converting or translating parameters in the response message into parametric form or format that can be processed or identified by the PCRF entity, and replying response message to the PCRF entity.

Figure 6:
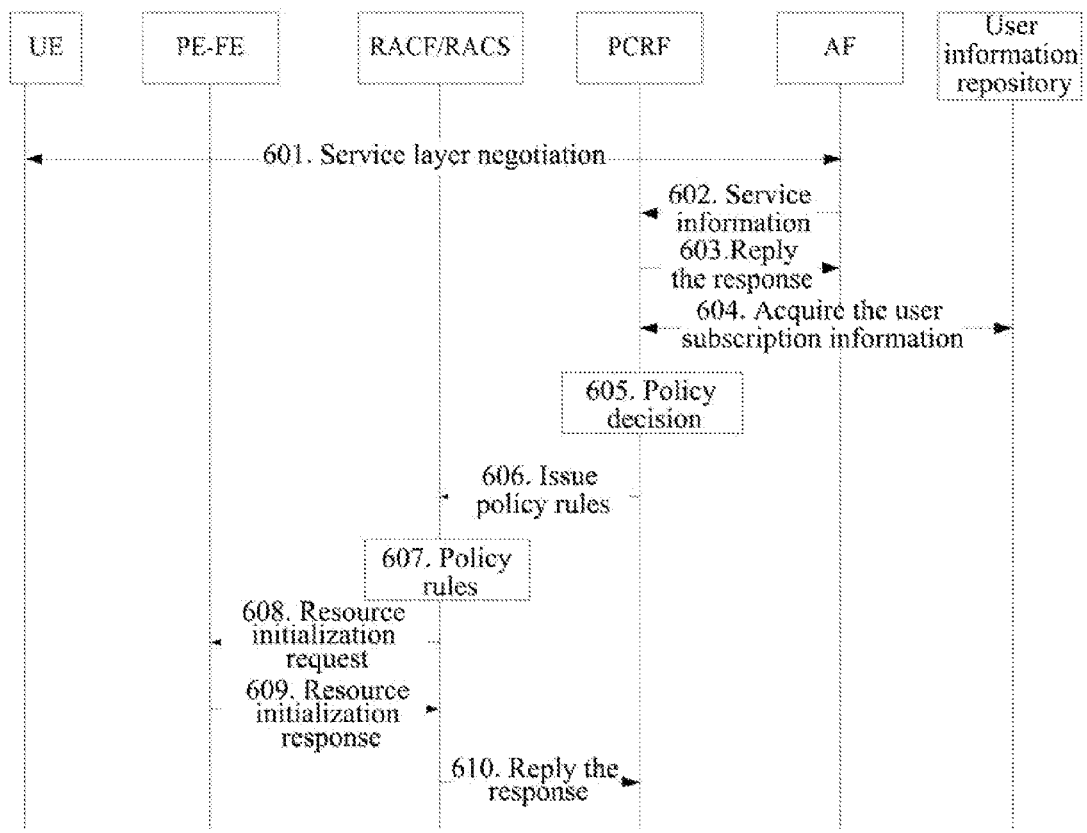
FIG. 6 is a flowchart according to a first embodiment of the present invention.

FIG. 6 is a flowchart according to a first embodiment of the present invention. The flowchart illustrates a mobile UE accessing a network and invoking services in a mobile network at a fixed network side, which involves a resource request flow of an interaction between a RACF/RACS entity and a PCRF entity, and comprises the following steps:

601: the UE invoking services, implementing a negotiation of service information of an application layer with an AF, i.e., negotiating the information such as types of service data streams of the services to be invoked, addresses and port numbers used by the service data streams, bandwidth required by the service data streams, encoding and decoding modes employed by the service data streams, and priorities of service data stream processing etc.;

602: the AF providing service information to the PCRF entity;

603: the PCRF entity storing the service information, and replying response message to the AF;

604: if the PRCF locally does not have subscription information of the user, the PCRF entity interacting with a user information repository to acquire the subscription information of the user; and if the PRCF has the subscription information of the user, skipping the step;

605: the PCRF entity performing an authorization check on services according to user subscription information, policy rules of local operators etc.; and if the check passes, the PCRF entity making a policy decision and establishing policy rules;

606: the PCRF entity issuing the policy rules to the RACF/RACS entity, wherein, the PCRF entity can carry the policy rules through resource request message;

607: the RACF/RACS entity firstly performing an authorization check according to policy rules of local operators, resource availability etc., and if the check passes, the RACF/RACS entity converting or translating the policy rules from the PCRF entity into policy rules suitable for an installation of the transport functional entity at the fixed network side;

for example, the RACF/RACS entity converting emergence service parameters defined under the PCC into parameters having the highest service priority under the RACF/RACS entity; and the RACF/RACS entity can further directly discard parameters from the PCC which are inherent at the mobile network side, such as parameters of an IP-CAN.

608: the RACF/RACS entity transmitting resource initialization request message to the transport functional entity (such as the PE-FE), which carries the final policy rules;

609: the transport functional entity installing the policy rules, and transmitting resource initialization response message to the RACF/RACS entity;

610: the RACF/RACS entity replying response message to the PCRF entity;

wherein, in Step 603, the response message replied by the PCRF entity to the AF can also be transmitted after Step 610.

Figure 7:
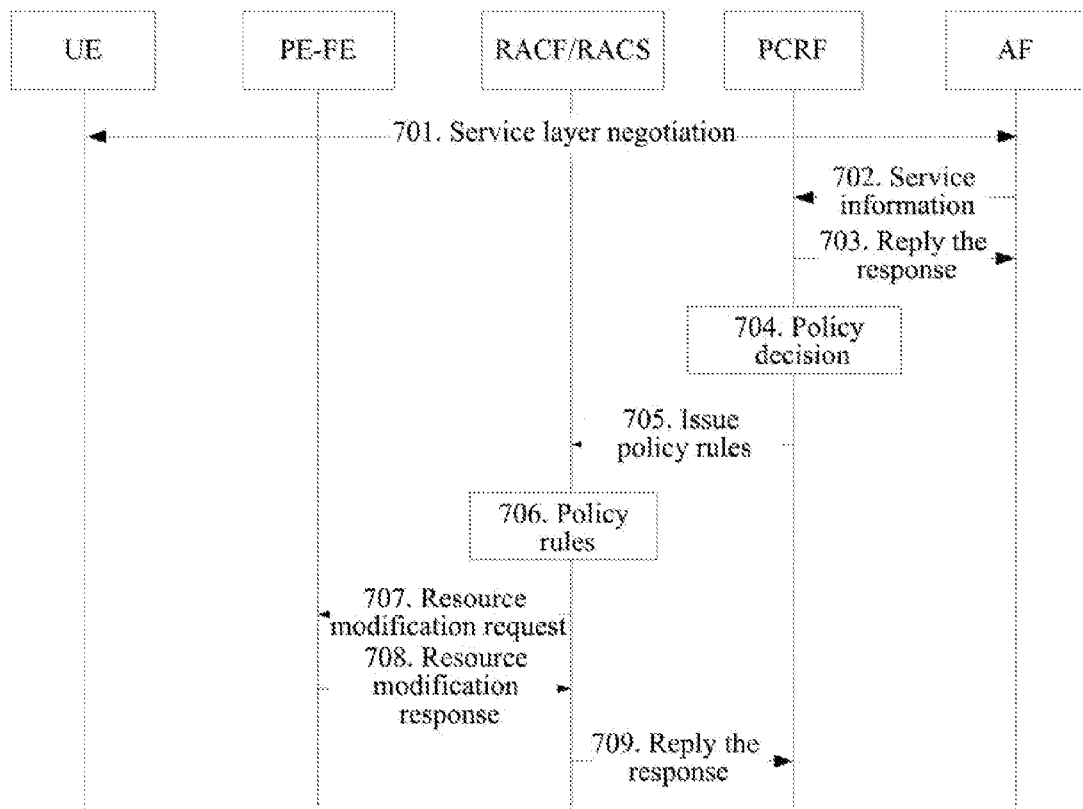
FIG. 7 is a flowchart according to a second embodiment of the present invention.

FIG. 7 is a flowchart according to a second embodiment of the present invention. The flowchart illustrates a mobile UE accessing a network and invoking services in a mobile network at a fixed network side, which involves a resource modification flow of an interaction between a RACF/RACS entity and a PCRF entity, and comprises the following steps:

701: modifying the services, and the UE and the AF implementing a negotiation of service information of an application layer, for example, the UE negotiating bandwidth required by modifying service data streams with the network;

702: the AF providing the newest service information to the PCRF entity;

703: the PCRF entity storing the service information, and replying response message to the AF;

704: the PCRF entity performing an authorization check on services according to user subscription information, policy rules of local operators etc.; and if the check passes, the PCRF entity making a policy decision and establishing policy rules;

705: the PCRF entity issuing the policy rules to the RACF/RACS entity, wherein, the PCRF entity can carry the policy rules through resource modification request message;

706: the RACF/RACS entity firstly performing an authorization check according to policy rules of local operators, resource availability etc., and if the check passes, the RACF/RACS entity converting or translating the policy rules from the PCRF entity into policy rules suitable for an installation of the transport functional entity at the fixed network side;

for example, the RACF/RACS entity converts emergence service parameters defined under the PCC into parameters having the highest service priority under the RACF/RACS entity; and the RACF/RACS entity can directly discard parameters from the PCC which are inherent at the mobile network side, such as parameters of an IP-CAN.

707: the RACF/RACS entity transmitting resource modification request message to the transport functional entity, which carries the final policy rules;

708: the transport functional entity installing the policy rules, and transmitting resource modification response message to the RACF/RACS entity;

709: the RACF/RACS entity replying response message to the PCRF entity.

Please note that in Step 703, the response message replied by the PCRF entity to the AF can also be transmitted after Step 709.

Figure 8:
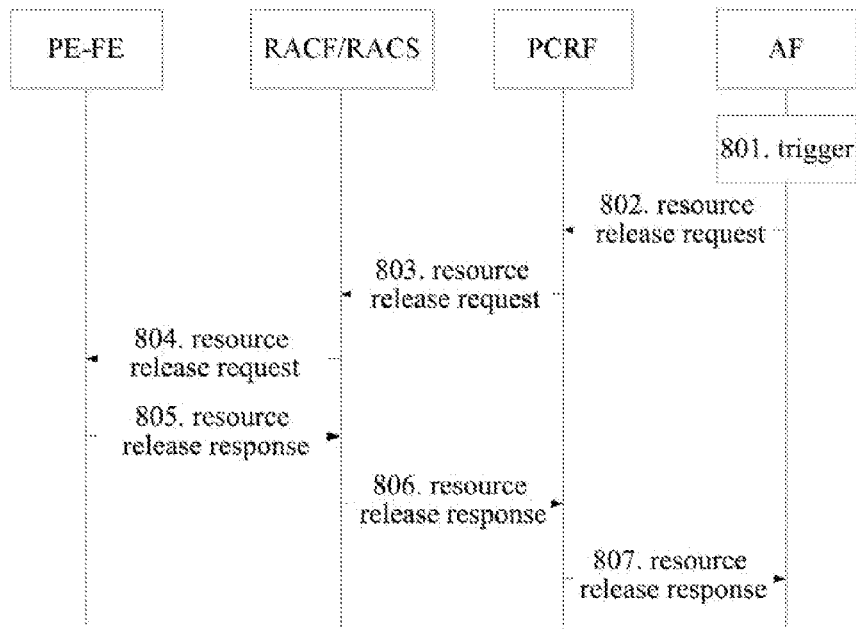
FIG. 8 is a flowchart according to a third embodiment of the present invention.

FIG. 8 is a flowchart according to a third embodiment of the present invention. The flowchart illustrates a mobile UE accessing a network and invoking services in a mobile network at a fixed network side, which involves a resource release flow of an interaction between a RACF/RACS entity and a PCRF entity, and comprises the following steps:

801: the UE initiating a service release request, transmitting the release request message to an AF, and triggering the AF to generate resource release request message;

802: the AF transmitting the resource release request message to the PCRF entity to release service data streams to which the services correspond;

803: the PCRF entity transmitting the resource release request message to the RACF/RACS entity;

804: after the RACF/RACS entity converting or translating the resource release request message from the PCRF entity into a format of a form suitable for an identification of the transport functional entity at the fixed network, the RACF/RACS entity transmitting the resource release request message to the transport functional entity to uninstall the policy rules thereon and release corresponding resources;

805: the transport functional entity replying resource release response message to the RACF/RACS entity;

806: the RACF/RACS entity replying the resource release response message to the PCRF entity;

807: the PCRF entity replying the resource release response message to the AF;

In conclusion, the resource and admission control function entity according to the embodiments of the present invention comprises a receiving module and a conversion module, wherein, the receiving module is configured to receive request message transmitted by a PCRF entity in a mobile network; and the conversion module is configured to convert the received request message or parameters carried in the request message into the form that can be processed or identified by a transport functional entity in the fixed network.

The conversion module is further configured to perform an authorization check on services; and when the check passes, convert policy rules carried in the request message into policy rules suitable for an installation of the transport functional entity in the fixed network.

A resource and admission control system according to the embodiments of the present invention comprises a resource and admission control function entity in a fixed network and a PCRF entity in a mobile network, wherein, the PCRF entity is configured to transmit request message to the resource and admission control function entity; wherein, the request message is resource request message, or resource modification request message, or resource release request message.

the resource and admission control function entity is configured to receive the request message transmitted by the PCRF entity, and convert the request message or parameters carried in the request message into the form that can be processed or identified by a transport functional entity in the fixed network.

Wherein, the resource and admission control function entity is further configured to return response message to the PCRF entity, and before returning the response message, convert parameters in the response message into the form that can be processed or identified by the PCRF entity or convert the response message into the form that can be processed or identified by the PCRF entity.

Wherein, the PCRF entity is further configured to perform an authorization check on services according to user subscription information, policy rules of local operators etc.; and when the check passes, make a policy decision and establish policy rules according to user subscription information, policy rules of local operators and service information, and carry the policy rules into the request message; and the resource and admission control function entity is further configured to perform the authorization check on the services after receiving the request message; and when the check passes, convert the policy rules into policy rules suitable for an installation of the transport functional entity in the fixed network.

Wherein, the resource and admission control function entity in the fixed network is a Resource and Admission Control Function (RACF) entity or a Resource and Admission Control Sub-system (RACS) entity, wherein, the interface between the RACF or RACS and the PCRF entity is an inter-domain interface between the PCRF entities.

Wherein, the resource and admission control function entity is further configured to actively transmit notification message to the PCRF entity or transmit the notification message to the PCRF entity according to the subscription of the PCRF entity, to notify the PCRF entity of current resource information and/or bearer information.

With the method and system described in the present invention, the problem of a mobile UE accessing at a fixed network and invoking a resource and admission control of services in a mobile network can be solved.

Although the present invention is described in combination with specific embodiments, modifications and variations can be made for those skilled in the art without departing from the spirit or scope of the present invention. Such modifications and variations are considered as being within the scope of the present invention and the scope of the appended claims.

INDUSTRIAL APPLICABILITY

The present invention provides a method for an interaction between resource and admission control systems and a resource and admission control system. Policy control on the services is performed through the interaction between a resource and admission control function entity in a fixed network and a PCRF entity in a mobile network, and the RACF/RACS entity in the fixed network converts a format of the message during the interaction, which can solve the problem of a mobile UE accessing at the fixed network and invoking a resource and admission control of services in the mobile network.

What is claimed is:

1. A method for an interaction between resource and admission control systems, comprising:
when a mobile user equipment accesses a network at a fixed network side and visits a service function (AF) entity in a mobile network, a resource and admission control function entity in the fixed network receiving from a Policy and Charging Rule Function (PCRF) entity in the mobile network a request message carrying policy rules which are established by the PCRF entity in the mobile network according to service information provided by the AF entity in the mobile network,
the resource and admission control function entity in the fixed network converting the policy rules established by the PCRF entity in the mobile network in the request message into the policy rules that are suitable for an installation of a transport functional entity in the fixed network side;
the resource and admission control function entity in the fixed network transmitting the converted policy rules to the transport functional entity in the fixed network, so that the transport functional entity in the fixed network installs the policy rules; thereby the mobile user equipment can access the fixed network side to have services from the mobile network;
wherein, the resource and admission control function entity in the fixed network is a Resource and Admission Control Function (RACF) entity in ITU-T or a Resource and Admission Control Sub-system (RACS) entity in TISPAN.

2. The method according to claim 1, wherein,
after the transport functional entity in the fixed network installs the policy rules, the method further comprises:
the resource and admission control function entity in the fixed network receiving a response message transmitted from the transport functional entity in the fixed network, converting parameters in the response message into a form that can be processed or identified by the PCRF entity in the mobile network and returning the converted response message to the PCRF entity in the mobile network.

3. The method according to claim 1, wherein,
before the step of the resource and admission control function entity in the fixed network receiving from the PCRF entity in the mobile network the request message carrying policy rules established by the PCRF entity in the mobile network, the method further comprises:
the PCRF entity in the mobile network performing an authorization check on the services, when the authorization check passes, making a policy decision and establishing the policy rules according to user subscription information, policy rules of local operators and the service information, carrying the policy rules into the request message, and transmitting the request message to the resource and admission control function entity in the fixed network.

4. The method according to claim 3, wherein,
after the step of the resource and admission control function entity in the fixed network receiving the request message and before the step of converting the policy rules in the request message into the policy rules suitable for an installation of a transport functional entity in the fixed network, the method further comprises:
the resource and admission control function entity in the fixed network performing an authorization check to on the services; and when the authorization check passes, executing the step of converting.

5. The method according to claim 1, wherein,
the request message is a resource request message, or a resource modification request message.

6. The method according to claim 1, wherein, the method further comprises:
the resource and admission control function entity in the fixed network further actively transmitting a notification message to the PCRF entity in the mobile network or transmitting the notification message to the PCRF entity in the mobile network according to a subscription of the PCRF entity in the mobile network, to notify the PCRF entity in the mobile network of current resource information and/or bearer information.

7. A resource and admission control function entity in a fixed network, comprising at least one processor, at least one memory coupled with the at least one processor and comprising computer readable program code that when executed by the at least one processor causes the at least one processor to perform operations comprising a receiving module and a conversion module, wherein,
the receiving module is configured to, when a mobile user equipment accesses a network at a fixed network side and visits a service function (AF) entity in a mobile network, receive from a Policy and Charging Rule Function (PCRF) entity in the mobile network a request message carrying policy rules which are established by the PCRF entity in the mobile network according to service information provided by the AF entity in the mobile network; and
the conversion module is configured to convert the policy rules established by the PCRF entity in the mobile network in the request message into the policy rules that are suitable for an installation of a transport functional entity in the fixed network side, and transmit the converted policy rules to the transport functional entity in the fixed network, so that the transport functional entity in the fixed network installs the policy rules; thereby the mobile user equipment can access the fixed network side to have services from the mobile network;
wherein, the resource and admission control function entity in the fixed network is a Resource and Admission Control Function (RACF) entity in ITU-T or a Resource and Admission Control Sub-system (RACS) entity in TISPAN.

8. The resource and admission control function entity in the fixed network according to claim 7, wherein,
the conversion module is further configured to perform an authorization check on the services; and when the authorization check passes, convert the policy rules established by the PCRF entity in the mobile network in the request message into the policy rules that are suitable for the installation of the transport functional entity in the fixed network.

9. A resource and admission control system, comprising a processor which comprises a resource and admission control function entity and a transport functional entity in a fixed network, and a Policy and Charging Rule Function (PCRF) entity in a mobile network, wherein, the PCRF entity in the mobile network is configured to, when a mobile user equipment accesses a network at the fixed network side and visits a service function (AF) entity in the mobile network, establish policy rules according to service information provided by the AF entity in the mobile network, and transmit a request message carrying the policy rules to the resource and admission control function entity in the fixed network; and the resource and admission control function entity in the fixed network is configured to receive the request message transmitted by the PCRF entity in the mobile network, convert the policy rules established by the PCRF entity in the mobile network in the request message into the policy rules that are suitable for an installation of a transport functional entity in the fixed network side, and transmit the converted policy rules to the transport functional entity in the fixed network; and the transport functional entity in the fixed network is configured to receive the converted request message carrying the policy rules and install the policy rules; thereby the mobile user equipment can access the fixed network side to have services from the mobile network;

wherein, the resource and admission control function entity in the fixed network is a Resource and Admission Control Function (RACF) entity in ITU-T or a Resource and Admission Control Sub-system (RACS) entity in TISPAN.

10. The system according to claim 9, wherein, the resource and admission control function entity in the fixed network is further configured to receive a response message transmitted from the transport functional entity in the fixed network, convert parameters in the response message into a form that can be processed or identified by the PCRF entity in the mobile network, and return the converted response message to the PCRF entity in the mobile network.

11. The system according to claim 9, wherein, the PCRF entity in the mobile network is further configured to perform an authorization check on the services, when the authorization check passes, make a policy decision and establish the policy rules according to user subscription information, policy rules of local operators and the service information, and carry the policy rules into the request message; and the resource and admission control function entity in the fixed network is further configured to perform an authorization check on the services after receiving the request message; and when the authorization check passes, convert the policy rules established by the PCRF entity in the mobile network in the request message into the policy rules that are suitable for the installation of the transport functional entity in the fixed network.

12. The system according to claim 9, wherein, the request message transmitted by the PCRF entity in the mobile network is a resource request message, or a resource modification request message.

13. The system according to claim 9, wherein, the resource and admission control function entity in the fixed network is further configured to actively transmit a notification message to the PCRF entity in the mobile network or transmit the notification message to the PCRF entity in the mobile network according to a subscription of the PCRF entity in the mobile network, to notify the PCRF entity in the mobile network of current resource information and/or bearer information.

14. The method according to claim 1, further comprising:

the resource and admission control function entity in the fixed network receiving a resource release request message which indicates to release service data streams to which the service corresponds and is transmitted by the PCRF entity in the mobile network, converting the resource release request message into a form suitable for identifying by the transport functional entity in the fixed network, and transmitting the converted resource release request message to the transport functional entity in the fixed network to uninstall the policy rules thereon and release corresponding resources.

15. The resource and admission control function entity in the fixed network according to claim 7, wherein, the receiving module is further configured to receive a resource release request message which indicates to release service data streams to which the service corresponds and is transmitted by the PCRF entity in the mobile network;

the conversion module is further configured to convert the resource release request message into a form suitable for identifying by the transport functional entity in the fixed network, and transmit the converted resource release request message to the transport functional entity in the fixed network to uninstall the policy rules thereon and release corresponding resources.

16. The system according to claim 9, wherein, the resource and admission control function entity in the fixed network is further configured to receive a resource release request message which indicates to release service data streams to which the service corresponds and is transmitted by the PCRF entity in the mobile network, convert the resource release request message into a form suitable for identifying by the transport functional entity in the fixed network, and transmit the converted resource release request message to the transport functional entity in the fixed network to uninstall the policy rules thereon and release corresponding resources.

\* \* \* \* \*